E. Clark.
Grinding Mill.
No. 36,893.   Patented Nov. 11, 1862.
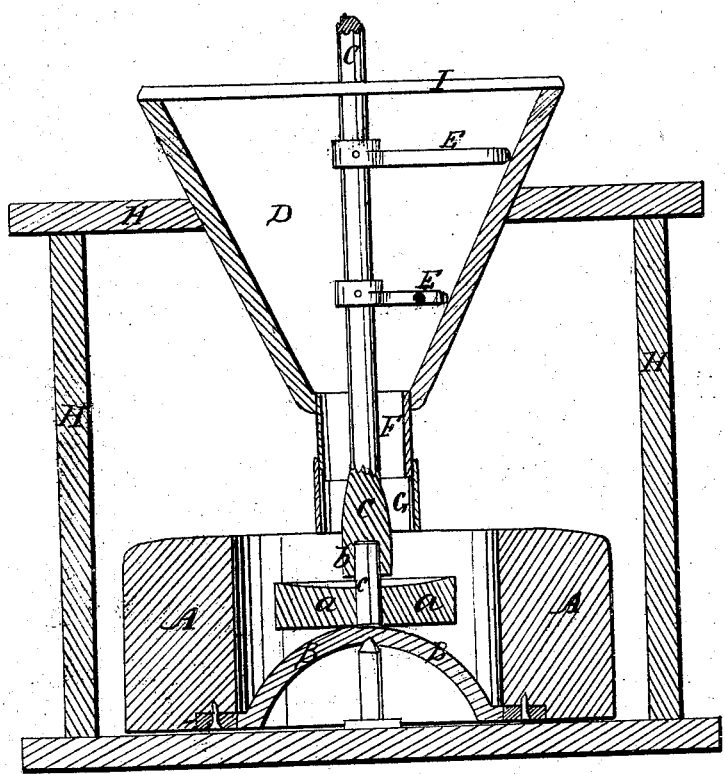
Witnesses:
Harry W. Priel.
John Mathys.
Inventor:
Edwin Clark.
By atty. A. B. Stoughton

UNITED STATES PATENT OFFICE.

EDWIN CLARK, OF LANCASTER, PENNSYLVANIA.

IMPROVEMENT IN GRINDING-MILLS.

Specification forming part of Letters Patent No. 36,893, dated November 11, 1862.

*To all whom it may concern:*

Be it known that I, EDWIN CLARK, of Lancaster, in the county of Lancaster and State of Pennsylvania, have invented certain new and useful Improvements in Grinding-Mills; and I hereby declare that the following is a full, clear, and exact description of the same, reference being had to the accompanying drawing, which represents a vertical section through a mill-hopper and mill stone or burr, and shows the several parts in their working connection.

I am aware that what is known as a "still-feed" in grist-mills has long been known; and I am also aware that in these still-feed arrangements a tube and a disk, dish, or distributer has been used in connection with the tube. These things I do not claim.

My invention consists in combining with the tube and a disk or its equivalent a vertical shaft that passes up through the tube into the hopper to facilitate the feeding of grain or middlings from the hopper through the tube to the disk or its equivalent, and thence to the grinding-surfaces.

To enable others skilled in the art to make and use my invention, I will proceed to describe the same with reference to the drawing.

A represents a millstone, which may be hung and moved in any of the well-known ways.

B is the balance rynd connected to the stone A, and to this balance-rynd is attached a disk, dish, distributer, or equivalent device, a, to which a shaft, C, is connected in any manner, so as to turn with the disk or its substitute. The shaft C extends upward into the hopper D, and has upon it arms or agitators E, for the purpose of loosening up grain or middlings and preventing them from clogging in the hopper. To the bottom of the hopper there is fastened a tube, F, which extends down toward the eye of the stone A, and connected with this tube F may be a second one, G, that can be adjusted by sliding it up or down upon the tube F.

Instead of one tube I contemplate using two or more, so that the grain or middlings may pass not only through the center tube, but also between it and those concentrically arranged around it.

H is the hopper-frame, and I a bridge-tree for supporting the upper portion of the vertical shaft.

The operation of this mechanism is obvious. The stone A carries around with it the rynd B, the disk or its equivalent $a$, and the shaft C. The grain or other material to be ground is loosened up by the shaft C, and, passing through the tube (or tubes) $c$, is distributed by the device $a$ as it passes toward the grinding-surfaces.

The shaft C may have a pod in its lower end to set over a square shank, $c$, on the disk $a$, or a square hole may be made in the disk, into which a square shank on the lower end of the shaft C may fit; or any other fastening by screws, pins, or other device may be used that will cause the shaft and disk to rotate together.

Having thus fully described my invention, what I claim therein as new, and desire to secure by Letters Patent, is—

The combination of the disk, tube, and vertical shaft, when said shaft passes through both the tube and the hopper and stirs or loosens the grain or middlings for the purpose of facilitating the feeding of grain or middlings to the stones or burrs, to be ground, substantially as described.

EDWIN CLARK.

Witnesses:
 A. B. STOUGHTON,
 H. W. PRICE.